United States Patent
Xu

(10) Patent No.: US 8,411,031 B2
(45) Date of Patent: Apr. 2, 2013

(54) INPUT DEVICE HAVING MAGNETIC BUTTON STRUCTURE

(75) Inventor: Zhong Xu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 351 days.

(21) Appl. No.: 12/840,414

(22) Filed: Jul. 21, 2010

(65) Prior Publication Data

US 2011/0279372 A1 Nov. 17, 2011

(30) Foreign Application Priority Data

May 12, 2010 (CN) .......................... 2010 1 0170298

(51) Int. Cl.
*G06F 3/033* (2006.01)
(52) U.S. Cl. .................... 345/156; 345/158; 345/163
(58) Field of Classification Search .......... 345/156–158, 345/163–166, 167
See application file for complete search history.

(56) References Cited

U.S. PATENT DOCUMENTS

| | | | | |
|---|---|---|---|---|
| 7,737,945 B2 * | 6/2010 | West et al. | ...................... | 345/157 |
| 2004/0239461 A1 * | 12/2004 | Kincaid et al. | ................. | 335/207 |
| 2006/0267933 A1 * | 11/2006 | Tai et al. | ......................... | 345/157 |
| 2010/0090952 A1 * | 4/2010 | Zhang et al. | .................. | 345/163 |

* cited by examiner

*Primary Examiner* — Alexander S Beck
*Assistant Examiner* — James M Holland
(74) *Attorney, Agent, or Firm* — Altis Law Group, Inc.

(57) ABSTRACT

An input device includes a cover and a base. The cover includes a button and a protrusion. The protrusion protrudes from the button. The base includes a processing unit and a button controlling module. The button controlling module includes a first magnetic member, a second magnetic member, and a movement sensing unit. The adjacent ends of the first magnetic member and the second magnetic member have the same polarity. The protrusion of the button contacts the first magnetic member. The movement sensing unit is for sensing the movement of the second magnetic member and for transmitting the sensed movement data of the second magnetic member to the processing unit. The processing unit determines the depressed button according to the sensed movement data of the second magnetic member.

14 Claims, 9 Drawing Sheets

INPUT DEVICE HAVING MAGNETIC BUTTON STRUCTURE

BACKGROUND

1. Technical Field

The present disclosure relates to an input device with a magnetic button structure.

2. Description of Related Art

A commonly used input control device such as a mouse, usually includes one or more buttons. When a button is depressed, a clicking sound may be heard. In a quiet environment, such as a library, the clicking sound may disturb others.

Additionally, the commonly used input device only generates a signal indicating a button is pressed, which is of limited use in many applications, such as a racing game.

DETAILED DESCRIPTION

An input device 1 is disclosed. The input device 1 can be a mouse, a game controller, or other input device for controlling operations of a host apparatus. For illustrative purposes only, a mouse is used for example.

Figure 1:
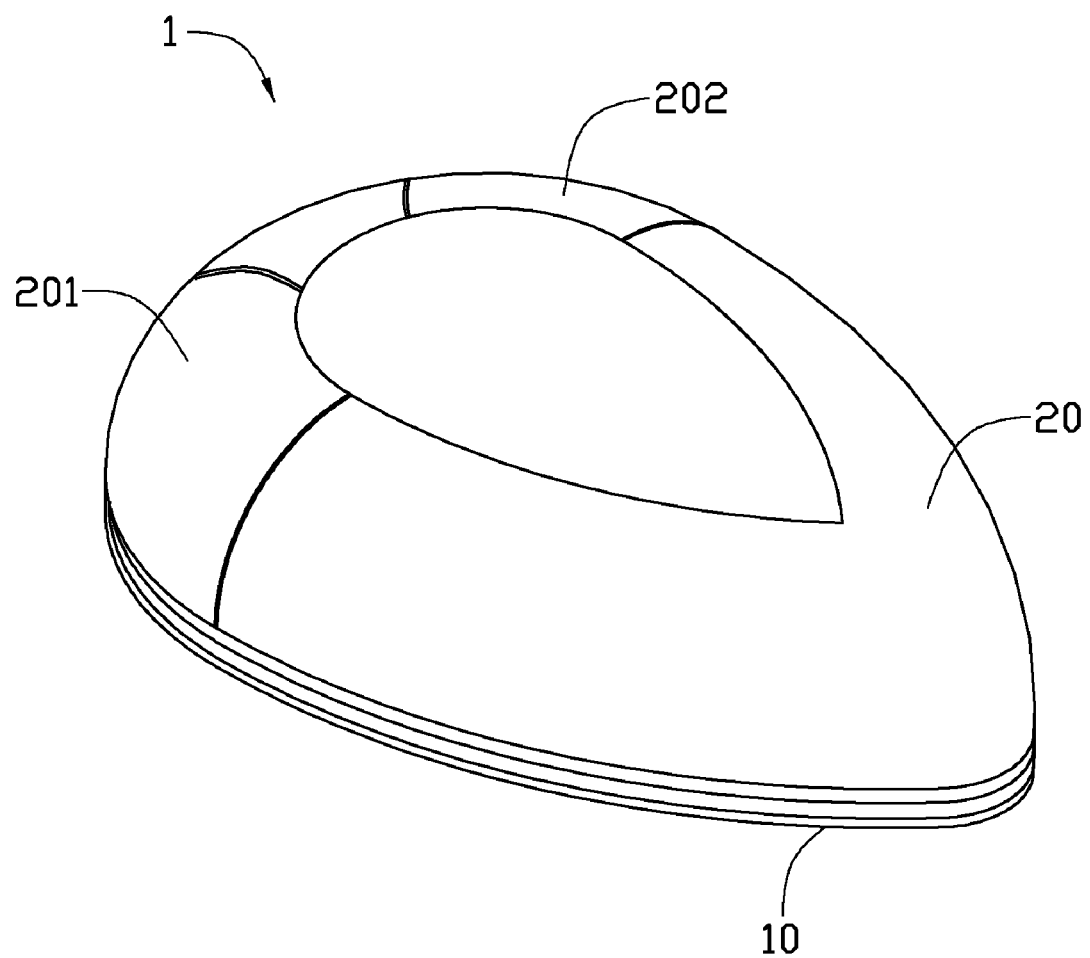
FIG. 1 is an assembled, isometric view of an input device in accordance with one embodiment.
Figure 2:
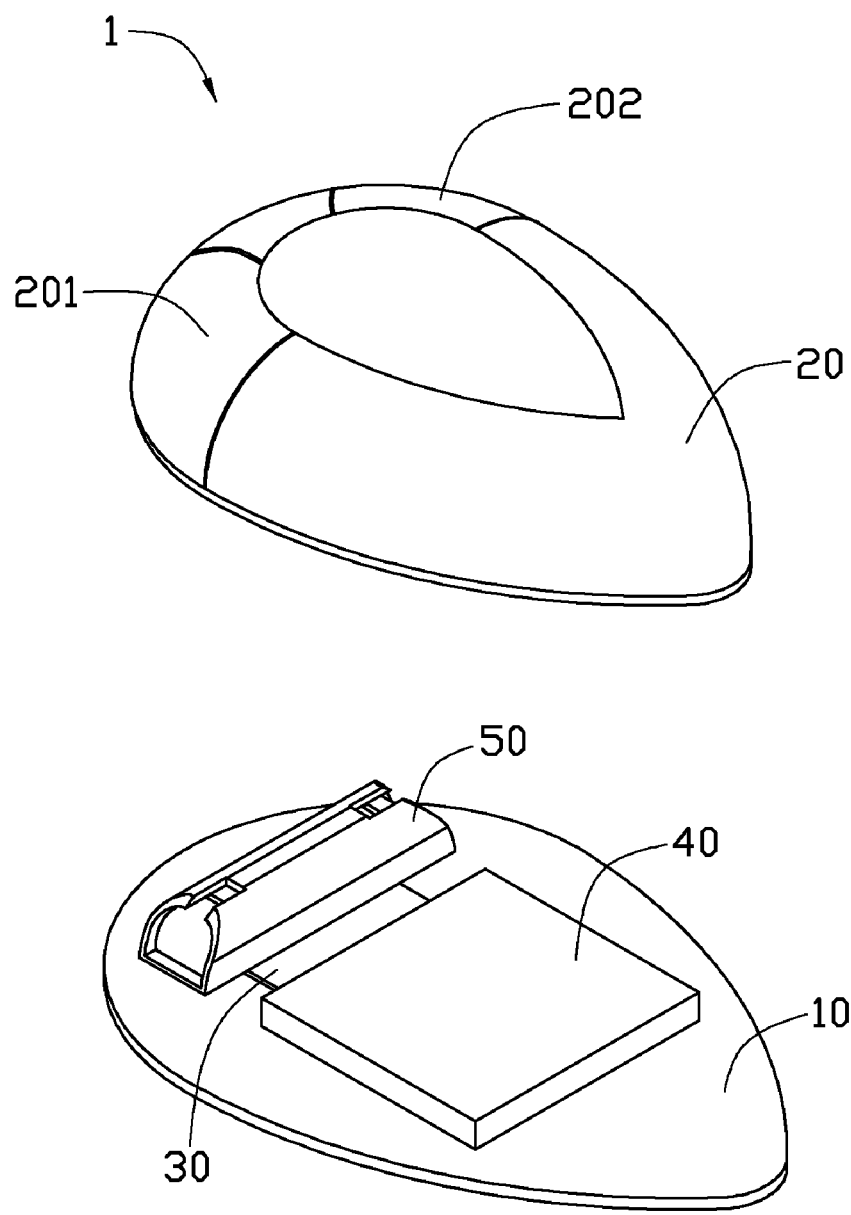
FIG. 2 is an exploded, isometric view of the input device in FIG. 1.

Referring to FIGS. 1 and 2, the input device 1 includes a base 10, a cover 20, a processing unit 30, a displacement determining module 40, and a button controlling module 50. The cover 20 is detachably fixed to the base 10 and cooperates with the base 10 to form a chamber enclosing the processing unit 30, the displacement determining module 40, and the button controlling module 50.

The displacement determining module 40 is positioned on the base 10 and electrically connected to the processing unit 30. The displacement determining module 40 is used for determining movement of the input device 1 and transmitting movement data to the processing unit 30.

Figure 3:
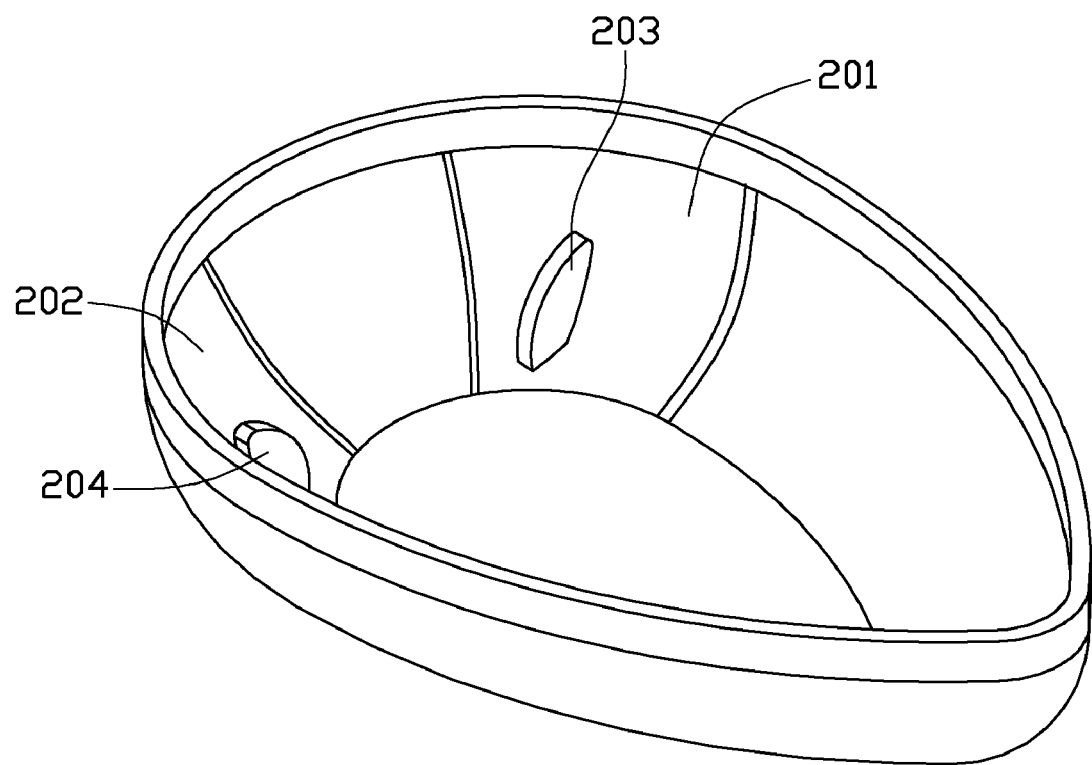
FIG. 3 is an inverted view of a cover of the input device in FIG. 1.

The cover 20 includes a first button 201 and a second button 202. As shown in FIG. 3, a first protrusion 203 can protrude from an inner surface of the first button 201, and a second protrusion 204 can protrude from an inner surface of the second button 202.

Figure 4:
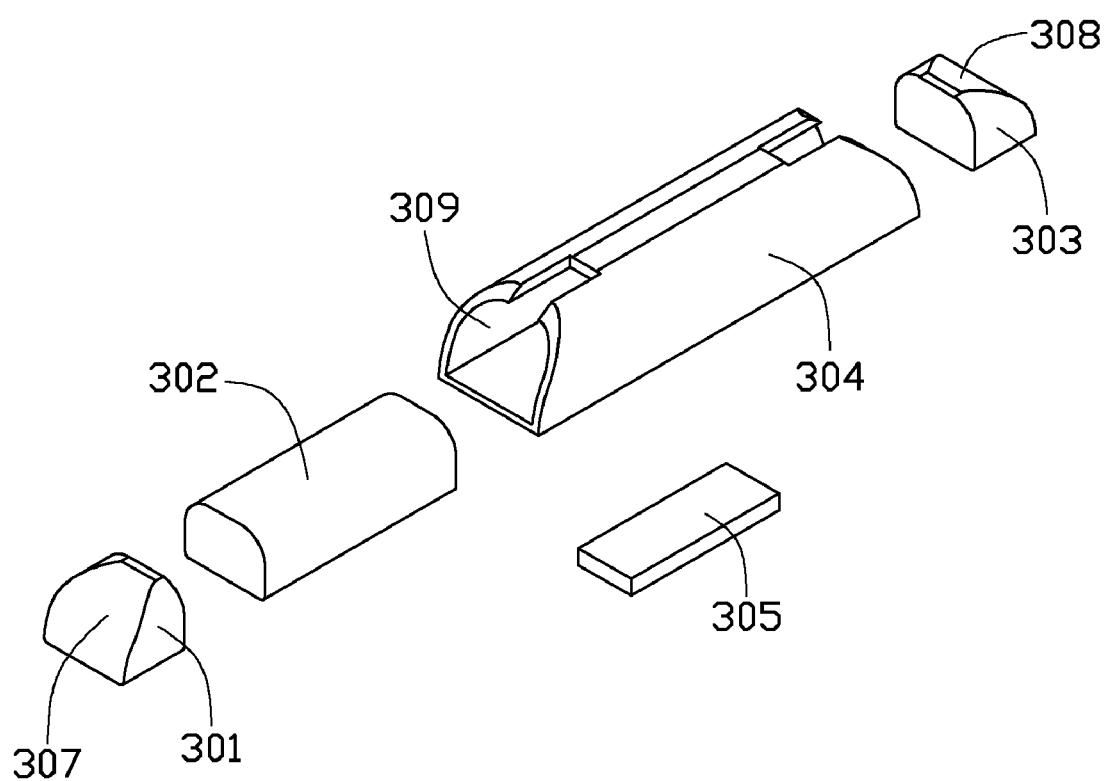
FIG. 4 is an exploded, isometric view of a button controlling module of the input device in FIG. 1.

The button controlling module 50 is electrically connected to the processing unit 30. As shown in FIG. 4, the button controlling module 50 includes a first magnetic member 301, a second magnetic member 302, a third magnetic member 303, a carrier 304, and a movement sensing unit 305. The first magnetic member 301 includes a sloped or curved end 307. The third magnetic member 303 includes a sloped or curved end 308. The carrier 304 defines a receiving space 309 for slidably receiving the magnetic members 301, 302 and 303. In the embodiment, the magnetic members 301, 302 and 303 are permanent magnets.

The magnetic members 301, 302 and 303 are arranged with the first and second magnetic members 301 and 302 having adjacent ends of the same polarity, and the second and third magnetic members 302 and 303 having adjacent ends of the same polarity. For example, if the adjacent ends of the first and second magnetic members 301 and 302 are both south poles, the adjacent ends of the second and third magnetic members 302 and 303 would be north poles.

Figure 5:
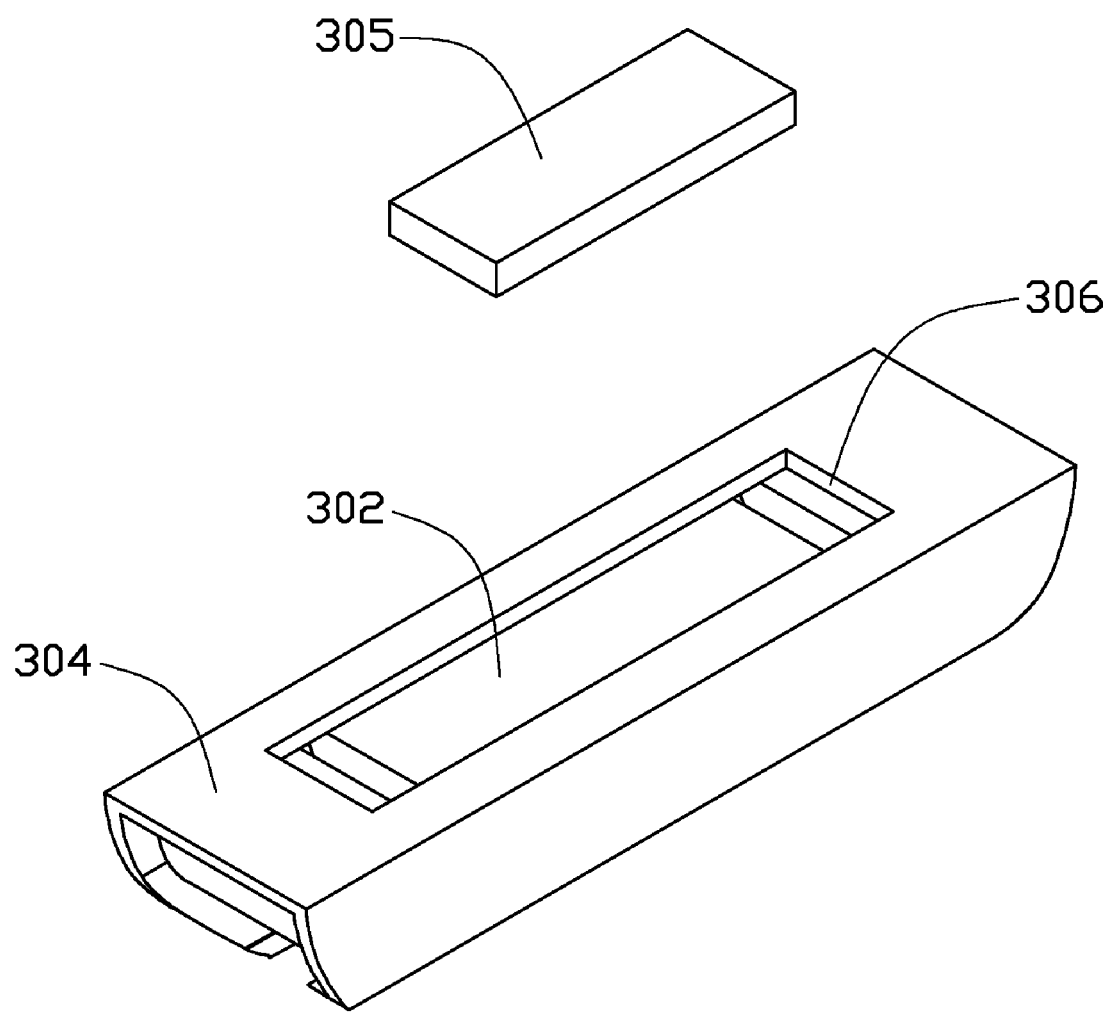
FIG. 5 is an exploded, isometric view of a button controlling module of the input device in FIG. 1, viewed from another aspect.

Repelling forces between the magnetic members 301, 302, and 303, result in gaps between the magnetic members 301, 302, and 303. The movement sensing unit 305 is positioned under the second magnet 302, and is able to sense movement of the second magnet 302 by, for example, infrared devices. An aperture 306 (as shown in FIG. 5) is defined in the carrier 304 to expose the second magnetic member 302, so that the movement sensing unit 305 can sense movement of the second magnetic member 302. The movement sensing unit 305 is connected to the processing unit 30 for transmitting the sensed movement data of the second magnetic member 302 to the processing unit 30.

After the cover 20 is fixed to the base 10, the first protrusion 203 contacts the end 307 of the first magnetic member 301, and the second protrusion 204 contacts the end 308 of the third magnetic member 303.

When the first button 201 is depressed, the first protrusion 203 pushes the first magnetic member 301 to move toward the second magnetic member 302 along the carrier 304. Due to the repelling force between the first and second magnetic members 301 and 302, the second magnetic member 302 moves toward the third magnetic member 303. When the second magnetic member 302 moves, the movement sensing unit 305 transmits movement data to the processing unit 30. The processing unit 30 can determine that the first button 201 is depressed according to the data.

Similarly, when the second button 202 is depressed, the second protrusion 204 pushes the third magnetic member 303 to move toward the second magnetic member 302. The second magnetic member 302 moves toward the first magnetic member 301. The processing unit 30 can determine that the second button 202 is pressed accordingly.

Figure 6:
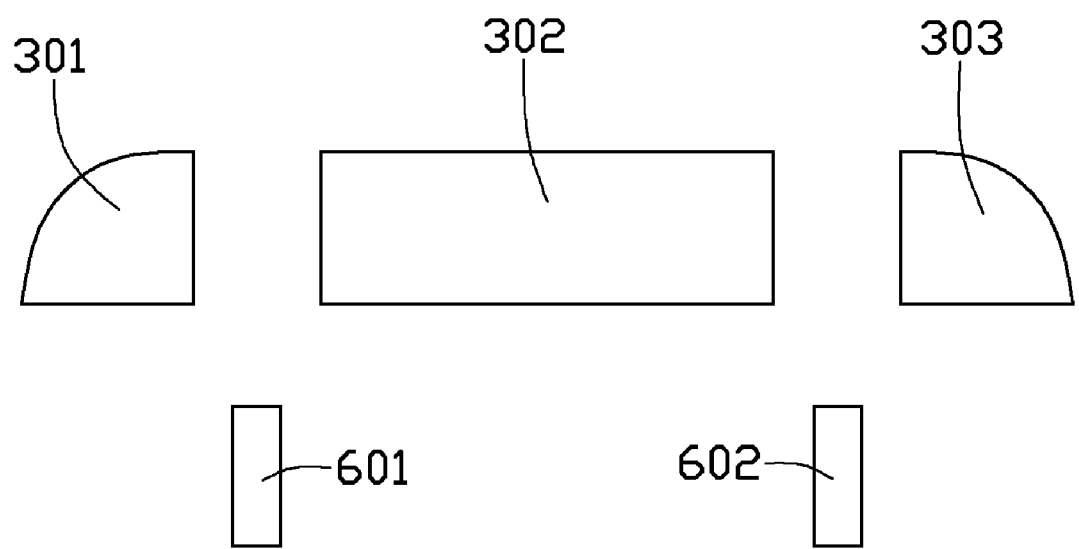
FIGS. 6 and 7 are schematic diagrams of determining a pressed button of the input device in FIG. 1.

In one embodiment, the movement sensing unit 305 includes at least two infrared sensing devices. As shown in FIG. 6, the movement sensing unit 305 includes a first infrared device 601 and a second infrared device 602. When the first button 201 and the second button 202 are not depressed, the first infrared device 601 is positioned between the first magnetic member 301 and the second magnetic member 302. The second infrared device 602 is positioned between the third magnetic member 303 and the second magnetic member 302. When the second magnetic member 302 is detected by the first infrared device 601, the processing unit 30 determines that the second button 202 is depressed. Similarly, when the second magnetic member 302 is detected by the second infrared device 602, the processing unit 30 determines that the first button 201 is depressed.

Figure 7:
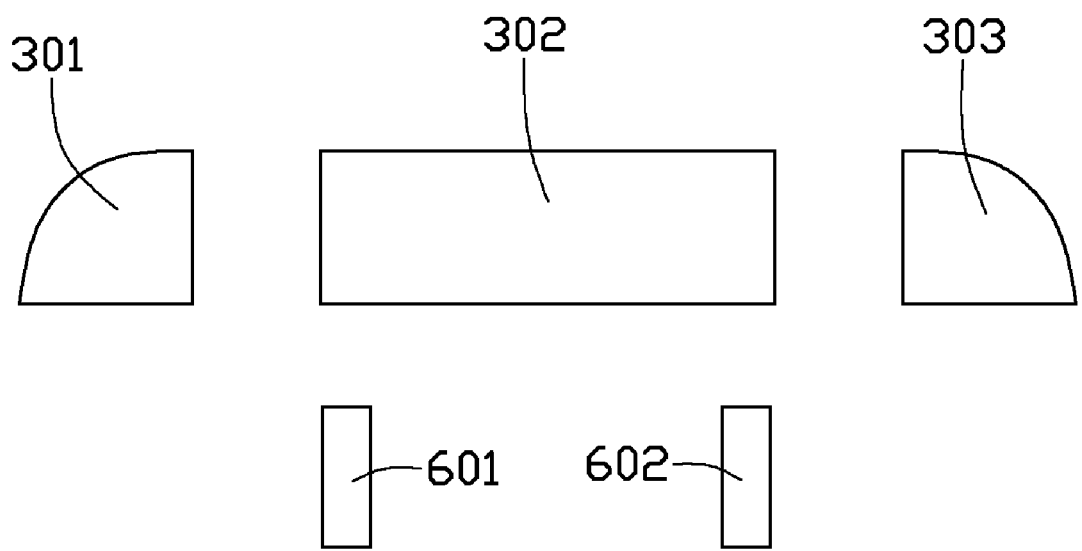

In another embodiment, as shown in FIG. 7, when the first button 201 and the second button 202 are not depressed, the first infrared device 601 and second infrared device 602 are blocked by the second magnetic member 302, namely, the second magnetic member 302 can be sensed by the first infrared device 601 and the second infrared device 602. When the second magnetic member 302 is not detected by the first infrared device 601, the processing unit 30 determines that the first button 201 is depressed. When the second magnetic member 302 is not detected by the second infrared device 602, the processing unit 30 determines the second button 202 is pressed.

Figure 8:
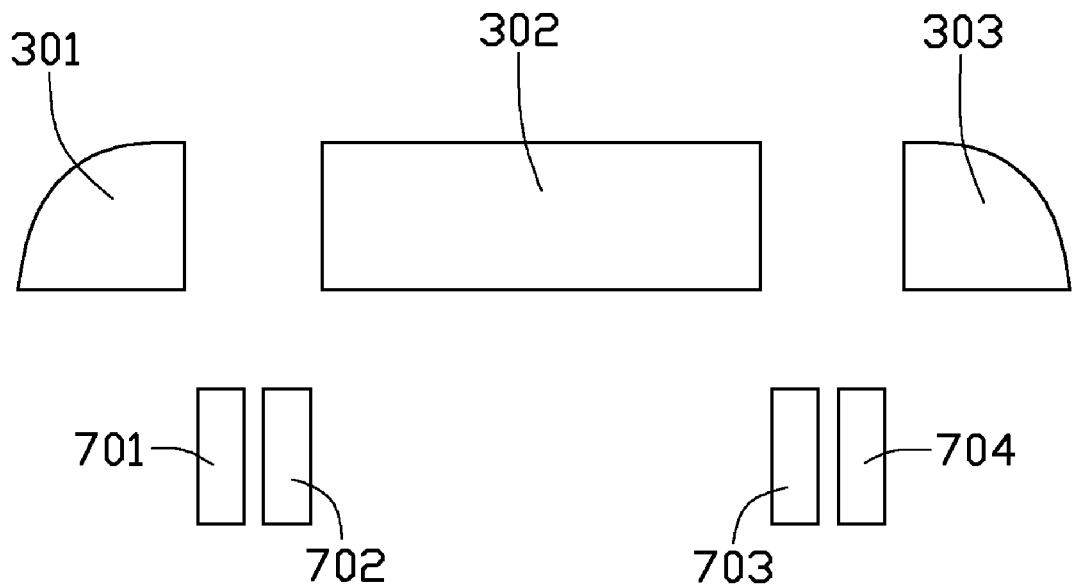
FIGS. 8 and 9 are schematic diagrams of determining a pressing speed of the input device of FIG. 1.

In yet another embodiment, the movement sensing unit 305 includes at least four infrared sensing devices. FIG. 8 shows a third infrared device 701, a fourth infrared device 702, a fifth infrared device 703, and a sixth infrared device 704. When the first button 201 and the second button 202 are not depressed, the third infrared device 701 and fourth infrared device 702 are positioned between the first magnetic member 301 and the second magnetic member 302 and are spaced from each other. The fifth infrared device 703 and sixth infrared device 704 are positioned between the third magnetic member 303 and the second magnetic member 302 and are spaced from each other.

When the first button 201 is depressed, the processing unit 30 records a first moving time period when the second magnetic member 302 moves from the fifth infrared device 703 to the sixth infrared device 704, and then computes a first pressed speed according to the recorded moving time and the distance between the fifth infrared device 703 and sixth infrared device 704. Similarly, when the second button 202 is depressed, the processing unit 30 records a second moving time period when the second magnetic member 302 moves from the third infrared device 701 to the fourth infrared device 702, and then computes a second pressed speed according to the recorded second moving time and the distance between the third infrared device 701 and fourth infrared device 702. In the embodiment, the pressing speed of the buttons 201 and 202 of the input device 1 can be associated with, for example, a speed of a car/bicycle in the racing game. Thus, a user can control a driving speed of the car/bicycle in a racing game by controlling the pressing speed of the button 201 and 202 of the input device 1.

Figure 9:
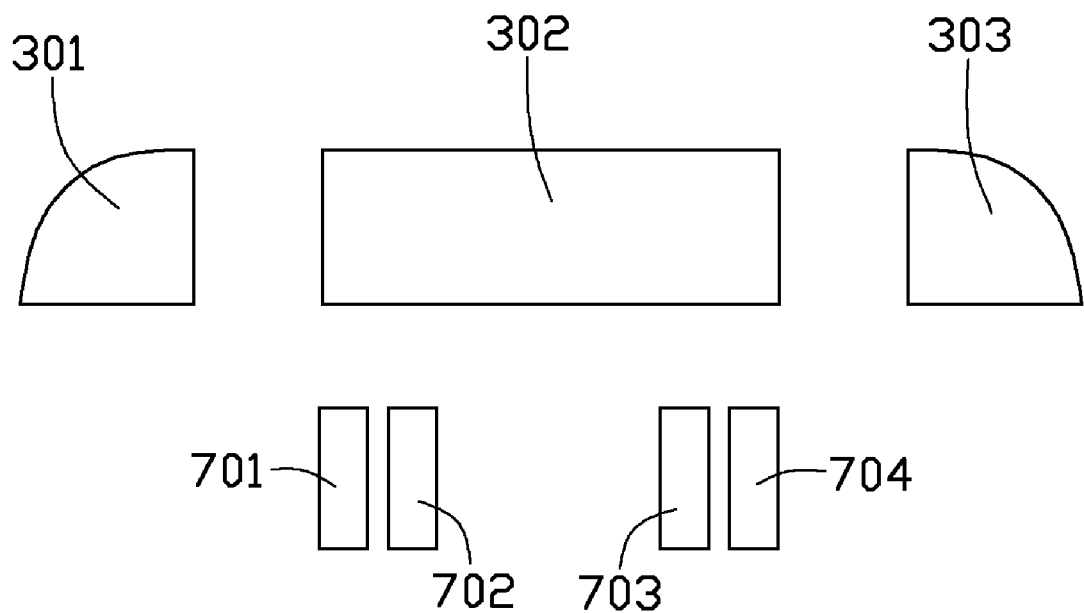

In one embodiment, as shown in FIG. 9, the four infrared sensing devices 701, 702, 703, and 704 are all blocked by the second magnetic member 302 when the first button 201 and the second button 202 are not depressed. The third infrared device 701 and fourth infrared device 702 are near the first magnetic member 301 and are spaced from each other. The fifth infrared device 703 and sixth infrared device 704 are near the third magnetic member 303 and are spaced from each other. The processing unit 30 records a first time period when the second magnetic member 302 is not detected by the third infrared device 701, records a second time period when the second magnetic member 302 is not detected by the fourth infrared device 702, and then computes a first time difference between the first time and the second time. The processing unit 30 computes a press speed of the first button 201 according to the time difference and the distance between the third and fourth infrared devices 701 and 702. Similarly, the processing unit 30 records a third time period when the second magnetic member 302 is not detected by the sixth infrared device 704, records a fourth time period when the second magnetic member 302 is not detected by the fifth infrared device 703, and then computes a second time difference between the third time and the fourth time. The processing unit 30 computes a press speed of the second button 202 according to the second time difference and the distance between the fifth infrared device 703 and the sixth infrared device 704.

In other embodiments, the input device 1 may include one button or more than two buttons. The elements of the input device such as magnet, infrared sensing device can be modified according to need.

Although the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. An input device, comprising:
   a cover comprising a first button, a second button, a first protrusion protruding from the first button, and a second protrusion protruding from the second button;
   a base:
   a processing unit; and
   a button controlling module comprising a first magnetic member, a second magnetic member, a third magnetic member, a carrier, and a movement sensing unit, the carrier defining a receiving space for slidably receiving the first, second, and third magnetic members, the second magnetic member being arranged between the first and third magnetic members, the first and second magnetic members having adjacent ends of the same polarity, and the third and second magnetic members having adjacent ends of the same polarity, wherein the first protrusion contacts the first magnetic member, and the second protrusion contacts the third magnetic member; the movement sensing unit senses movement of the second magnetic member and transmits the movement data of the second magnetic member to the processing unit; the processing unit determines which of the first and the second button is depressed according to the movement data.

2. The input device as described in claim 1, wherein the first, second, and third magnetic members are permanent magnets.

3. The input device as described in claim 1, wherein the first magnetic member and the third magnetic member each comprise a sloped or curved end, the first protrusion and the second protrusion of the cover contacting the sloped or curved end of the first magnetic member and the sloped or curved end of the third magnetic member, respectively.

4. The input device as described in claim 1, wherein an aperture is defined in the carrier to expose the second magnetic member.

5. The input device as described in claim 1, wherein the movement sensing unit comprises at least one infrared device.

6. The input device as described in claim 5, wherein the movement sensing unit comprises a first infrared device and a second infrared device; when the first button and the second button are not depressed, the first infrared device is positioned between the first magnetic member and the second magnetic member, and the second infrared device is positioned between the third magnetic member and the second magnetic member; when the second magnetic member is detected by the first infrared device, the processing unit determines that the second button is depressed; when the second magnetic member is detected by the second infrared device, the processing unit determines that the first button is depressed.

7. The input device as described in claim 5, wherein the movement sensing unit comprises a first infrared device and a second infrared device; when the first button and second button are not depressed, the first infrared device and the second infrared device are blocked by the second magnetic member; when the second magnetic member is not detected by the first infrared device, the processing unit determines that the first button is depressed; when the second magnetic member is not detected by the second infrared device, the processing unit determines the second button is depressed.

8. An input device, comprising:
   a cover comprising at least one button, a protrusion protruding from each button;
   a base;

a processing unit; and a button controlling module comprising at least one first magnetic member, at least one second magnetic member, a carrier, and a movement sensing unit, the carrier defining a receiving space for slidably receiving the at least one first magnetic member and the at lease one second magnetic member; the at least one first magnetic member and the at least one second magnetic member having the adjacent ends of the same polarity, the protrusion of each button contacting each first magnetic member, the movement sensing unit sensing the movement of the at least one second magnetic member and transmitting the movement data of the at least one second magnetic member to the processing unit;

the processing unit determining which of the at least one button is depressed according to the movement data.

9. The input device as described in claim 8, wherein the at least one first magnetic member and the at least one second magnetic member are permanent magnets.

10. The input device as described in claim 8, wherein the at least one first magnetic member comprises a sloped or curved end, each protrusion of the cover contacts the sloped or curved end of each first magnetic member.

11. The input device as described in claim 8, wherein at least one aperture is defined in the carrier to expose the at least one second magnetic member.

12. The input device as described in claim 8, wherein the movement sensing unit comprises at least one infrared device.

13. The input device as described in claim 12, wherein the at least one first infrared device is positioned between the at least one first magnetic member and the at least one second magnetic member; when the at least one second magnetic member is detected by the at least one infrared device, the processing unit determines the depressed button.

14. The input device as described in claim 12, wherein the at least one infrared device is blocked by the at least one second magnetic member when the at least one button is not depressed, when the at least one second magnetic member is not detected by the at least one infrared device, the processing unit determines the depressed button.

* * * * *